United States Patent
Lin et al.

(10) Patent No.: US 12,439,383 B2
(45) Date of Patent: Oct. 7, 2025

(54) METHODS AND APPARATUSES FOR DOWNLINK SIGNALING RECEPTION

(71) Applicant: SHARP KABUSHIKI KAISHA, Sakai (JP)

(72) Inventors: Wan-Chen Lin, Taipei (TW); Mei-Ju Shih, Taipei (TW); Chia-Hung Lin, Taipei (TW); Chia-Hsin Lai, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/785,698

(22) Filed: Jul. 26, 2024

(65) Prior Publication Data

US 2025/0039847 A1 Jan. 30, 2025

Related U.S. Application Data

(60) Provisional application No. 63/529,614, filed on Jul. 28, 2023.

(51) Int. Cl.
*H04W 72/02* (2009.01)
*H04B 7/06* (2006.01)
*H04W 72/231* (2023.01)
*H04W 76/20* (2018.01)

(52) U.S. Cl.
CPC ........ *H04W 72/02* (2013.01); *H04B 7/06968* (2023.05); *H04W 72/231* (2023.01); *H04W 76/20* (2018.02)

(58) Field of Classification Search
CPC ... H04W 72/02; H04W 72/40; H04W 72/231; H04W 72/23; H04W 76/20; H04W 36/00; H04W 40/36; H04W 52/02; H04B 7/06968

See application file for complete search history.

(56) References Cited

U.S. PATENT DOCUMENTS

| | | | |
|---|---|---|---|
| 2020/0322109 A1* | 10/2020 | Yu | H04B 7/022 |
| 2022/0217694 A1* | 7/2022 | Kim | H04L 1/1864 |
| 2022/0295457 A1* | 9/2022 | Jang | H04L 5/0053 |

* cited by examiner

*Primary Examiner* — Brian T Le
(74) *Attorney, Agent, or Firm* — ScienBiziP, P.C.

(57) ABSTRACT

Methods and apparatuses for Downlink (DL) signaling reception are provided. The method receives a configuration of multiple Control Resource Sets (CORESETs) overlapping in time domain. The method selects a first CORESET, and then selects a second CORESET by performing a set of operations including: in response to determining that the first CORESET is associated with only one Quasi-Co-Location (QCL) type D property, selecting a CORESET that is associated with two QCL type D properties, one of which being the only one QCL type D property, as the second CORESET, and in response to determining that the first CORESET is associated with two QCL type D properties, selecting a CORESET that is associated with only one QCL type D property, which is one of the two QCL type D properties, as the second CORESET. The method monitors, at least, the first CORESET and the second CORESET to receive the DL signaling.

14 Claims, 3 Drawing Sheets

METHODS AND APPARATUSES FOR DOWNLINK SIGNALING RECEPTION

CROSS-REFERENCE TO RELATED APPLICATION(S)

The present disclosure claims the benefit of and priority to U.S. Provisional Patent Application Ser. No. 63/529,614, filed on Jul. 28, 2023, entitled "METHOD AND APPARATUS FOR HANDLING QUASI COLOCATION," the content of which is hereby incorporated herein fully by reference into the present application for all purposes.

FIELD

The present disclosure is related to wireless communication and, more specifically, to methods and apparatuses for Downlink (DL) signaling reception.

BACKGROUND

Various efforts have been made to improve different aspects of wireless communication for the cellular wireless communication systems, such as the $5^{th}$ Generation (5G) New Radio (NR) system, by improving data rate, latency, reliability, and mobility. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). As the demand for radio access continues to increase, however, there exists a need for further improvements in the art.

SUMMARY

The present disclosure is related to methods and apparatuses for Downlink (DL) signaling reception.

According to a first aspect of the present disclosure, a method performed by a User Equipment (UE) for receiving Downlink (DL) signaling from a Base Station (BS) is provided. The method includes receiving, from the BS, via a Radio Resource Control (RRC) message, a configuration of multiple Control Resource Sets (CORESETs) overlapping in time domain; selecting a first CORESET from the CORESETs based on the configuration; and selecting a second CORESET from the CORESETs by performing a set of operations. The set of operations includes the following actions: in response to determining that the first CORESET is associated with only one Quasi-Co-Location (QCL) type D property, selecting, from the CORESETs, a CORESET that is associated with two QCL type D properties as the second CORESET, one of the two QCL type D properties being the only one QCL type D property associated with the first CORESET; and in response to determining that the first CORESET is associated with two QCL type D properties, selecting, from the CORESETs, a CORESET that is associated with only one QCL type D property as the second CORESET, the only QCL type D property being one of the two QCL type D properties associated with the first CORESET. The method further includes monitoring, at least, the first CORESET and the second CORESET to receive the DL signaling from the BS.

In some implementations of the first aspect of the present disclosure, the first CORESET includes a lowest Common Search Space (CSS) set index and a lowest Component Carrier (CC) index among the CORESETs.

In some implementations of the first aspect of the present disclosure, one of the first CORESET and the second CORESET is configured to be associated with two Transmission Configuration Indication (TCI) states for a Single Frequency Network (SFN)-based Physical Downlink Control Channel (PDCCH) scheme, and the other one of the first CORESET and the second CORESET is configured to be associated with a single TCI state for a Time Division Multiplexing (TDM)-based PDCCH repetition scheme.

In some implementations of the first aspect of the present disclosure, the first CORESET is configured in a first cell and the second CORESET is configured in a second cell.

In some implementations of the first aspect of the present disclosure, the second cell includes a target cell for a handover procedure.

In some implementations of the first aspect of the present disclosure, the method further includes selecting a third CORESET from the CORESETs; and monitoring the first CORESET, the second CORESET, and the third CORESET to receive the DL signaling from the BS.

In some implementations of the first aspect of the present disclosure, the third CORESET is associated with at least one QCL type D property that is the same as the QCL type D property that is associated with the first CORESET when the first CORESET is associated with only one QCL type D property.

According to a second aspect of the present disclosure, a User Equipment (UE) for receiving Downlink (DL) signaling from a Base Station (BS) is provided. The UE includes at least one processor and at least one non-transitory computer-readable medium coupled to the at least one processor. The at least one non-transitory computer-readable medium stores one or more computer-executable instructions that, when executed by the at least one processor, cause the UE to receive, from the BS, via a Radio Resource Control (RRC) message, a configuration of multiple Control Resource Sets (CORESETs) overlapping in time domain; select a first CORESET from the CORESETs based on the configuration; and select a second CORESET from the CORESETs by performing a set of operations. The set of operations includes: in response to determining that the first CORESET is associated with only one Quasi-Co-Location (QCL) type D property, selecting, from the CORESETs, a CORESET that is associated with two QCL type D properties as the second CORESET, one of the two QCL type D properties being the only one QCL type D property associated with the first CORESET; and in response to determining that the first CORESET is associated with two QCL type D properties, selecting, from the CORESETs, a CORESET that is associated with only one QCL type D property as the second CORESET, the only one QCL type D property being one of the two QCL type D properties associated with the first CORESET. The one or more computer-executable instructions, when executed by the at least one processor, further cause the UE to monitor, at least, the first CORESET and the second CORESET to receive the DL signaling from the BS.

In some implementations of the second aspect of the present disclosure, the first CORESET includes a lowest Common Search Space (CSS) set index and a lowest Component Carrier (CC) index among the CORESETs.

In some implementations of the second aspect of the present disclosure, one of the first CORESET and the second CORESET is configured to be associated with two Transmission Configuration Indication (TCI) states for a Single Frequency Network (SFN)-based Physical Downlink Control Channel (PDCCH) scheme, and the other one of the first CORESET and the second CORESET is configured to be associated with a single TCI state for a Time Division Multiplexing (TDM)-based PDCCH repetition scheme.

In some implementations of the second aspect of the present disclosure, the first CORESET is configured in a first cell and the second CORESET is configured in a second cell.

In some implementations of the second aspect of the present disclosure, the second cell includes a target cell for a handover procedure.

In some implementations of the second aspect of the present disclosure, the one or more computer-executable instructions, when executed by the at least one processor, further cause the UE to select a third CORESET from the CORESETs; and monitor the first CORESET, the second CORESET, and the third CORESET to receive the DL signaling from the BS.

In some implementations of the second aspect of the present disclosure, the third CORESET is associated with at least one QCL type D property that is the same as the QCL type D property that is associated with the first CORESET when the first CORESET is associated with only one QCL type D property.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
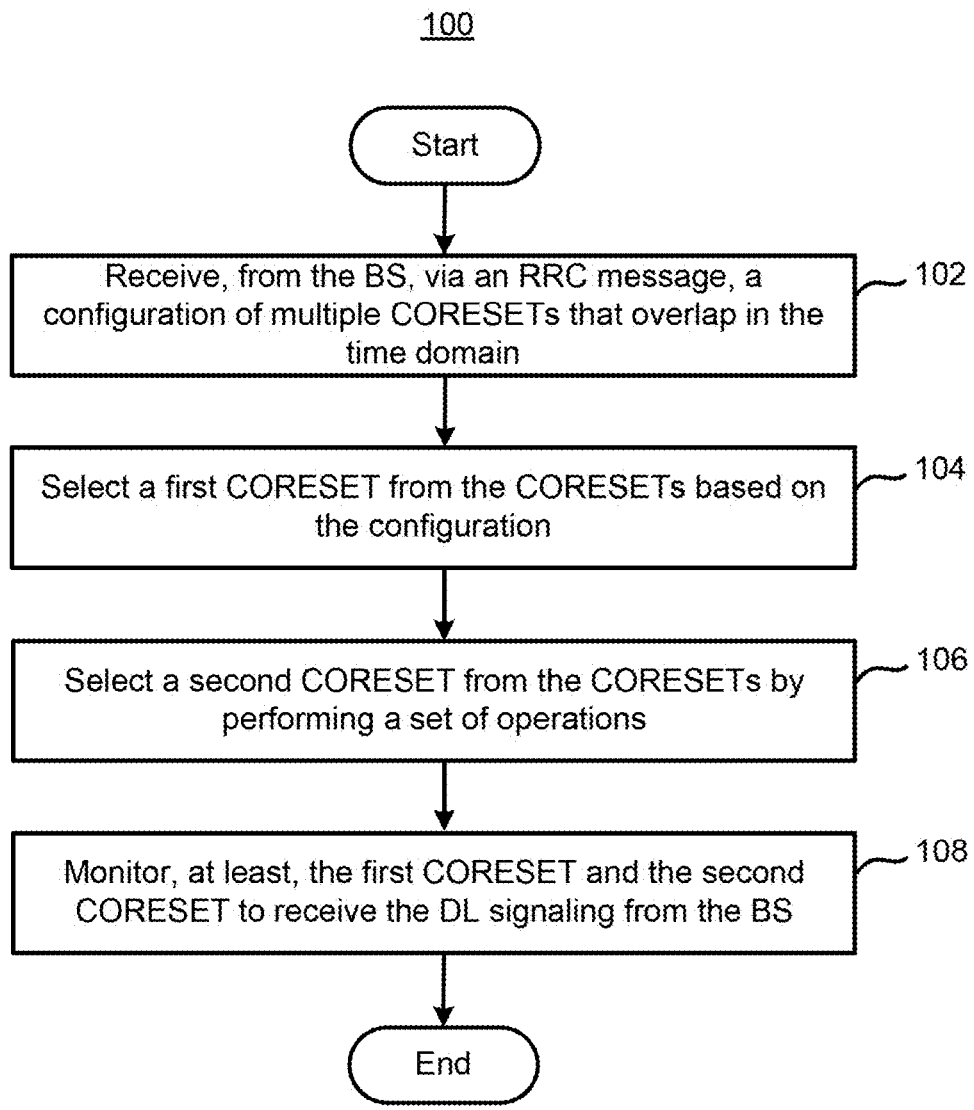
FIG. 1 is a flowchart illustrating a method/process for receiving DL signaling from a BS, according to an example implementation of the present disclosure.

Some of the abbreviations in the present application are defined as follows and, unless otherwise specified, the abbreviations have the following meanings:

| Abbreviation | Full name |
| --- | --- |
| 3GPP | 3rd Generation Partnership Project |
| 5G | 5th Generation |
| 5GC | 5G Core |
| ACK | Acknowledgement |
| AL | Aggregation Level |
| AN-PDB | Access Network Packet Delay Budget |
| AS | Access Stratum |
| ASN.1 | Abstract Syntax Notation One |
| BA | Bandwidth Adaptation |
| BFD | Beam Failure Detection |
| BFRQ | Beam Failure Recovery Request |
| BS | Base Station |
| BSR | Buffer Status Report |
| BWP | Bandwidth Part |
| C-RNTI | Cell Radio Network Temporary Identifier |
| CA | Carrier Aggregation |
| CAG | Closed Access Group |
| CB | Codebook-Based |
| CCE | Control Channel Element |
| CDM | Code Division Multiplexing |
| CG | Configured Grant |
| CJT | Coherent Joint Transmission |
| CN | Core Network |
| CN-PDB | Core Network Packet Delay Budget |
| CORESET | Control Resource Set |
| CPE | Customer Premises Equipment |
| CRC | Cyclic Redundancy Check |
| CSI | Channel State Information |
| CSI-RS | Channel State Information Reference Signal |
| CS-RNTI | Configured Scheduling Radio Network Temporary Identifier |
| CSS | Common Search Space |
| CU | Central Unit |
| DAPS | Dual Active Protocol Stack |
| DC | Dual Connectivity |
| DCI | Downlink Control Information |
| DG | Dynamic Grant |
| DI | Delay Information |
| DL | Downlink |
| DL-SCH | Downlink Shared Channel |
| DMRS | Demodulation Reference Signal |
| DR | Delay Report |
| DRB | Data Radio Bearer |
| DTCH | Dedicated Traffic Channel |
| DU | Distributed Unit |
| ETSI | European Telecommunications Standards Institute |
| E-UTRA | Evolved Universal Terrestrial Radio Access |
| EN-DC | E-UTRA NR Dual Connectivity |
| EPC | Evolved Packet Core |
| eMBB | Enhanced Mobile BroadBand |
| eMTC | Enhanced Machine Type Communication |
| eNB | Evolved Node B |
| FDD | Frequency Division Duplexing |
| FR | Frequency Range |
| FR1 | Frequency Range 1 |
| FR2 | Frequency Range 2 |
| FWA | Fixed Wireless Access |
| GC-PDCCH | Group Common Physical Downlink Control Channel |
| GEO | Geostationary Equatorial Orbit |
| gNB | Next Generation Node B |
| GNSS | Global Navigation Satellite System |
| GW | Gateway |
| HARQ | Hybrid Automatic Repeat Request |
| HO | Handover |
| FR | Frequency Range |
| IAB | Integrated Access and Backhaul |
| ID | Identity |
| IE | Information Element |
| IoT | Internet of Things |
| IIoT | Industrial Internet of Things |
| ITS | Intelligent Transportation System |
| ITU | International Telecommunication Union |
| L1 | Layer 1 |
| L2 | Layer 2 |
| L3 | Layer 3 |
| LAN | Local Area Network |
| LCH | Logical Channel |
| LCID | Logical Channel Identity |
| LEO | Low Earth Orbit |
| LSB | Least Significant Bit |
| LTE | Long Term Evolution |
| LTM | L1/L2-Triggered Mobility |
| MAC | Medium Access Control |
| MAC CE | MAC Control Element |
| MCG | Master Cell Group |
| MCS | Modulation Coding Scheme |
| MCS-C-RNTI | Modulation Coding Scheme Cell Radio Network Temporary Identifier |
| MIB | Master Information Block |
| MIMO | Multi-Input Multi-Output |
| mMTC | Massive Machine Type Communications |
| MN | Master Node |
| MSB | Most Significant Bit |
| MTC | Machine Type Communication |
| mTRP | Multiple Transmission Reception Points |
| NACK | Negative Acknowledgement |
| NAS | Non-Access Stratum |
| NB-IoT | Narrow Band Internet of Things |
| NCB | Non-Codebook-Based |

| Abbreviation | Full name |
| --- | --- |
| NDI | New Data Indicator |
| NPN | Non-Public Network |
| NR | New Radio |
| NR-U | NR Unlicensed |
| NTN | Non-Terrestrial Network |
| NW | Network |
| PBCH | Physical Broadcast Channel |
| PCell | Primary Cell |
| PCI | Physical Cell Identity |
| PDB | Packet Delay Budget |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical |
| PLMN | Public Land Mobile Network |
| PNI-NPN | Public Network Integrated Non-Public Network |
| PRACH | Physical Random Access Channel |
| PSCell | Primary Secondary Cell |
| PSDB | PDU Set Delay Budget |
| PTAG | Primary Timing Advance Group |
| PTRS | Phase Tracking Reference Signal |
| PUCCH | Physical Uplink Control Channel |
| PUSCH | Physical Uplink Shared Channel |
| QCL | Quasi-CoLocation |
| QoS | Quality of Service |
| RA | Random Access |
| RACH | Random Access Channel |
| RAN | Radio Access Network |
| RAR | Random Access Response |
| RAT | Radio Access Technology |
| Rel-15 | Release 15 |
| Rel-16 | Release 16 |
| RF | Radio Frequency |
| RLC | Radio Link Control |
| RS | Reference Signal |
| RLF | Radio Link Failure |
| RSTD | Reference Signal Time Difference Measurement |
| RNTI | Radio Network Temporary Identifier |
| RO | RACH Occasion |
| RRC | Radio Resource Control |
| RRM | Radio Resource Measurement |
| RS | Reference Signal |
| RSRP | Reference Signal Received Power |
| RSRQ | Reference Signal Receiving Quality |
| RX | Reception |
| SCell | Secondary Cell |
| SCG | Secondary Cell Group |
| SDM | Spatial Division Multiplexing |
| SDT | Small Data Transmission |
| SFN | Single Frequency Network |
| SI | System Information |
| SIB | System Information Block |
| SINR | Signal to Interference plus Noise Ratio |
| SL | Sidelink |
| SLIV | Start and Length Indicator Value |
| SN | Secondary Node |
| SNPN | Stand-alone Non-Public Network |
| SpCell | Special Cell |
| SR | Scheduling Request |
| SRB | Signaling Radio Bearer |
| SRS | Sounding Reference Signal |
| SRI | SRS Resource Indicator |
| SSB | Synchronization Signal Block |
| STAG | Secondary Timing Advance Group |
| sTRP | Single Transmission Reception Point |
| STxMP | Simultaneous Transmission on Multiple Panels |
| SUL | Supplementary Uplink |
| TA | Timing Advance |
| TAG | Timing Advance Group |
| TAT | Time Alignment Timer |
| TB | Transport Block |
| TCI | Transmission Configuration Indication |
| TDD | Time Division Duplexing |
| TN | Terrestrial Network |
| TPC | Transmission Power Control |
| TPMI | Transmit Precoder Matrix Indication |
| TRP | Transmission Reception Point |
| TRS | Tracking Reference Signal |
| TS | Technical Specification |
| TX | Transmission |
| UCI | Uplink Control Information |
| UE | User Equipment |
| UL | Uplink |
| UL-CG | Uplink-Configured Grant |
| UPF | User Plane Function |
| URLLC | Ultra-Reliable and Low-Latency Communications |
| USIM | Universal Subscriber Identity Module |
| USS | UE-specific Search Space |
| V2X | Vehicle-to-Everything |
| VSAT | Very Small Aperture Terminal |
| XR | Extended Reality |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For consistency and ease of understanding, like features may be identified (although, in some examples, not illustrated) by the same numerals in the drawings. However, the features in different implementations may be different in other respects and shall not be narrowly confined to what is illustrated in the drawings.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent.

The expression "at least one of A, B and C" or "at least one of the following: A, B and C" means "only A, or only B, or only C, or any combination of A, B and C." The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details, such as functional entities, techniques, protocols, and standards, are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software, or a combination of software and hardware. Disclosed functions may correspond to modules which may be software, hardware, firmware, or any combination thereof.

A software implementation may include computer executable instructions stored on a computer-readable medium, such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or one or more Digital Signal Processor (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using multiple cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS may communicate with one or more UEs in the radio communication system via the cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may include the SpCell of an MCG. A Primary SCG Cell (PSCell) may include the SpCell of an SCG. MCG may include a group of serving cells associated with the Master Node (MN), including the SpCell and optionally one or more Secondary Cells (SCells). An SCG may include a group of serving cells associated with the Secondary Node (SN), including the SpCell and optionally one or more SCells.

As discussed above, the frame structure for NR supports flexible configurations for accommodating various next generation (e.g., 5G) communication requirements, such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3GPP may serve as a baseline for an NR waveform. The scalable OFDM numerology, such as adaptive sub-carrier spacing, channel bandwidth, and Cyclic Prefix (CP), may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Any two or more than two of the following paragraphs, (sub)-bullets, points, actions, behaviors, terms, or claims described in the present disclosure may be combined logically, reasonably, and properly to form a specific method.

Any sentence, paragraph, (sub)-bullet, point, action, behaviors, terms, or claims described in the present disclosure may be implemented independently and separately to form a specific method.

Dependency, e.g., "based on", "more specifically", "preferably", "in one embodiment", "in some implementations", etc., in the present disclosure is just one possible example which would not restrict the specific method.

"A and/or B" in the present disclosure may refer to either A or B, both A and B, or at least one of A and B.

The terms, definitions, and abbreviations included in the present disclosure are either sourced from existing documents (such as those from ETSI, ITU, or other sources) or newly created by experts from the 3GPP whenever there was a need for precise vocabulary.

In the present disclosure, although the term "gNB" is used throughout the document as an example of a base station, it should be understood that the term "gNB" may be replaced by any other type of BS (e.g., an eNB). Moreover, the terms "TRP," "beam," and "panel" may be used interchangeably. Additionally, the term "overlap" may include a partial overlapping or a full overlapping in time domain and/or frequency domain.

Examples of some selected terms in the present disclosure are provided as follows.

Antenna Panel: a conceptual term for a UE antenna implementation. It may be assumed that a panel is an operational unit for controlling a transmitting spatial filter (beam). A panel may typically include multiple antenna elements. In one implementation, a beam may be formed by a panel, and in order to form two beams simultaneously, two panels may be needed. Such simultaneous beamforming from multiple panels may be subject to UE capability. A similar definition for "panel" may be applicable by applying spatial receiving filtering characteristics. The UE panel information may be derived from the TCI state/UL beam indication information or from the network signaling.

Beam: A beam may refer to a spatial (domain) filtering. In one example, the spatial filtering may be applied in the analog domain by adjusting a phase and/or an amplitude of a signal before being transmitted by a corresponding antenna element. In another example, the spatial filtering may be applied in the digital domain by the Multi-Input Multi-Output (MIMO) technique in the wireless communication system. For example, "a UE made a PUSCH transmission by using a specific beam" may imply that the UE made the PUSCH transmission by using the specific spatial/digital domain filter. The "beam" may also be, but is not limited to be, represented as an antenna, an antenna port, an antenna element, a group of antennas, a group of antenna ports, or a group of antenna elements. The beam may also be formed by a certain reference signal resource. In short, the beam may be equivalent to a spatial domain filter through which the EM wave is radiated.

Beam information may include details about the selected or utilized beam or spatial filter. In some implementations, the individual beams (e.g., spatial filters) may be used to transmit individual reference signals. Consequently, a beam or beam information may be represented by one or more reference signal resource indices.

BWP: A subset of the total cell bandwidth of a cell is referred to as a Bandwidth Part (BWP) and a Bandwidth Adaptation (BA) may be achieved by configuring the UE with BWP(s) and instructing the UE which of the configured BWPs is currently the active one. To enable a BA on the PCell, the gNB configures the UE with UL and DL BWP(s). To enable the BA on SCells, in case of CA, the gNB configures the UE with one or more DL BWPs (e.g., there may be no BWP in the UL). For the PCell, the initial BWP is the BWP used for an initial access. For the SCell(s), the initial BWP is the BWP configured for the UE to operate after an SCell activation. The UE may be configured with a first active uplink BWP by a firstActiveUplinkBWP IE. If the first active uplink BWP is configured for an SpCell, the firstActiveUplinkBWP IE field may contain the ID of the UL BWP to be activated upon performing the RRC (re-)configuration. If the field is absent, the RRC (re-)configuration does not impose a BWP switching. If the first active uplink BWP is configured for an SCell, the firstActiveUplinkBWP IE field may contain the ID of the uplink bandwidth part to be used upon the MAC-activation of an SCell.

DCI: DCI may include downlink control information, and there may be various DCI formats used in a PDCCH. The DCI format may be a predefined format in which the downlink control information may be packed/formed and transmitted in a PDCCH.

TCI state: A TCI state may include parameters for configuring a QCL relationship between one or more DL reference signals and a target reference signal set. For example, a target reference signal set may include the DMRS ports of a PDSCH, a PDCCH, a PUCCH, or a PUSCH. The reference signals may include UL or DL reference signals. In NR Rel-15/16, the TCI state may be used for a DL QCL indication, whereas the spatial relation information may be used for providing the UL spatial transmission filter information for the UL signal(s) or channel(s). A TCI state may include the information similar to the spatial relation information, which may be used for UL transmission. In other words, from the UL perspective, a TCI state may provide the UL beam information that may indicate the relationship between a UL transmission and the DL or UL reference signals (e.g., the CSI-RS, the SSB, the SRS, and the PTRS).

HARQ: A functionality that ensures the delivery between peer entities at Layer 1 (e.g., Physical Layer). A single HARQ process may support one Transport Block (TB) when the physical layer is not configured for the downlink/uplink spatial multiplexing, and when the physical layer is configured for downlink/uplink spatial multiplexing, a single HARQ process may support one or more TBs. There may be one HARQ entity per serving cell. Each HARQ entity may support a parallel (number of) DL and UL HARQ process.

MIMO may be one of the key technologies in NR systems and may have been successful in commercial deployments. It may be important to identify and specify necessary enhancements for the uplink MIMO. Additionally, necessary enhancements for the downlink MIMO that may facilitate the use of a large antenna array, not only for FR1 but also for FR2, may still need to be introduced to fulfill the request for an evolution in NR deployments.

The Multiple Transmission and Reception Points (mTRP) may have been introduced to enhance the massive MIMO. The mTRP operation may improve the reliability, coverage, and capacity performance through flexible deployment scenarios. With the mTRP operation, a base station may communicate with a UE through the mTRP to make the data transmission be received with higher accuracy.

A unified TCI framework may be one of the MIMO techniques to reduce the signaling overhead due to the increment in antenna requirements. To support the MIMO techniques, the concept of QCL may provide the commonality of large-scale channel characteristics across the set of antenna ports to a UE. Thus, the UE may determine the channel characteristics from the QCL to improve its channel estimation, frequency estimation, and synchronization procedures. Furthermore, the QCL information may help the UE to obtain information on which SSB or CSI-RS is assumed to have a QCL with the PDCCH and PDSCH, allowing the UE to receive the PDCCH and PDSCH properly.

For monitoring the PDCCH associated with a CORESET, more than one QCL-Type D property (may also be referred to as QCL type D property) may be identified for the CA operation. However, there may be some ambiguity as to when to apply more than one QCL-Type D property to a CORESET(s) for the unified TCI framework and the LTM operation. Thus, the method and apparatus for the QCL in the unified TCI framework and the LTM operation, and more, are described in this disclosure.

When multiple overlapping CORESETs are configured, a UE may monitor the CORESETs with one or two QCL type D properties. For example, for a single cell or an intra-band CA mTRP based PDCCH repetition, the UE may monitor the PDCCHs in a first CORESET with a first QCL type D property. If a second CORESET (from the multiple overlapping CORESETs) exists, the UE may further monitor the PDCCHs in the second CORESET with a second QCL type D property that may be different from the first QCL type D property. If a third CORESET (from the multiple overlapping CORESETs) exists, the UE may further monitor the PDCCHs in the third CORESET with the first QCL type D property and/or the second QCL type D property.

Furthermore, if one or more CORESETs have two activated TCI states for a single cell operation or an intra-band CA operation, the UE may monitor the PDCCHs in a first CORESET with a first QCL type D property and a second QCL type D property that is different from the first QCL type D property. If a second CORESET (from the multiple overlapping CORESETs) exists, the UE may further monitor the PDCCHs in the second CORESET with the first QCL type D property and/or to the second QCL type D property.

However, for the CORESET in the unified TCI framework with the mTRP operation, the UE may monitor the PDCCHs in a CORESET with a first QCL-TypeD property and/or a second QCL type D property. Thus, whether to monitor the PDCCHs in the CORESETs with their QCL type D properties different from the first QCL type D property and/or the second QCL type D property may need to be specified.

Moreover, for the inter-band CA operation and/or for the LTM operation, the UE may monitor the PDCCHs in multiple overlapping CORESETs with more than two QCL type D properties for reducing the latency requirement. Therefore, whether to increase the number of CORESETs with more than two QCL type D properties may also need to be specified.

The following provides a general discussion of the terminology used in this disclosure (e.g., mTRP, TCI state, Unified TCI framework, and Inter-cell beam management).

mTRP mTRP may be a feature that enables a gNB to communicate with a UE using more than one TRP to ensure the reliability. Moreover, the same data stream(s) from multiple Transmission/Receiving Points (TRP) may be transmitted/received at least with an ideal backhaul, and different data streams from multiple TRPs may be transmitted/received with both ideal and non-ideal backhauls. The ideal backhaul may enable a single DCI format carried in a PDCCH from one TRP scheduling the data transmission/information from/to multiple TRPs (single-DCI based multi-TRP/panel transmission). The non-ideal backhaul, alternatively, may require more than one DCI format carried in the PDCCH(s) to schedule the data transmission/information corresponding to each TRP (multi-DCI based multi-TRP/panel transmission). To enhance the system reliability, at least one multi-TRP scheme may be applied to at least one channel/reference signal (e.g., a multi-TRP based PDSCH operation, a multi-TRP based PDCCH operation, a multi-TRP based PUCCH operation, and a multi-TRP based PUSCH operation).

TDM based PDCCH repetition: Two PDCCHs that have the same DCI format, DCI payload, number of CCEs, number of candidates for each AL in two search spaces associated with two CORESETs, may be linked to each other.

TDM based PDSCH repetition may include inter-slot based PDSCHs with the same TB, or intra-slot based PDSCHs with the same TB, corresponding to different TRPs. The inter-slot based PDSCHs may include repetitive PDSCHs, each of which scheduled in an individual slot. The intra-slot based PDSCHs may include repetitive PDSCHs that are scheduled within a slot.

TDM based PUCCH repetition may include inter-slot based PUCCH transmissions in response to the corresponding PDSCH receptions, and intra-slot based PUCCH transmissions in response to the corresponding PDSCH reception with the same UCI content corresponding to different beams for all the PUCCH formats in time manners. The inter-slot based PUCCH transmissions may correspond to repetitive PUCCHs, each of which being transmitted in an individual slot. The intra-slot based PUCCH transmissions may correspond to repetitive PUCCHs that are transmitted within a slot.

TDM based PUSCH repetition may include inter-slot based PUSCH transmissions with the same TB, or intra-slot based PUSCHs with the same TB, corresponding to different TRPs. The slot-based PUSCHs may include repetitive PUSCHs, each of which being scheduled in an individual slot. The non-slot-based PUSCHs may include repetitive PUSCHs that are scheduled within a slot.

FDM based repetition may include channels carrying the same TB corresponding to two TCI states for non-overlapped frequency resource allocation within a slot.

Multi-DCI based scheme: Multiple (e.g., two) PDCCHs, each in a separate search space and associated with a different CORESET pool index value, may carry different DCI formats. Each of these DCI formats may schedule its corresponding data streams/channels.

SFN based PDCCH scheme: A CORESET corresponding to a single frequency may be associated with two different beams.

SFN based PDSCH scheme: A PDSCH corresponding to a single frequency may be associated with two different beams.

SFN based PUSCH scheme: A PUSCH corresponding to a single frequency may be associated with two different beams.

SFN based PUCCH scheme: A PUCCH corresponding to a single frequency may be associated with two different beams.

SDM based PDSCH: A PDSCH may be scheduled by a DCI format indicating two TCI states and may be associated with Code Division Multiplexing (CDM) groups without data of values 1,2, and 3 referring to CDM groups {0}, {0,1}, {0,1,2}, respectively.

SDM based PUSCH: At least two PUSCHs overlapping in time and/or frequency domain may correspond to two different beams.

CJT scheme: It may be assumed that the network has knowledge about the detailed channels to the UE from two or more points. Up to two TCI states may be applied to CJT-based UL transmissions/DL receptions in a BWP/CC.

TCI State

A UE may be configured with a list including up to M Transmission Configuration Indication (TCI) state configurations. Each TCI state may contain parameters for configuring at least one quasi co-location (QCL) relationship between one or two downlink reference signals and the DMRS ports of the PDSCH, the DMRS port of PDCCH, or the CSI-RS port(s) of a CSI-RS resource. The UL TCI states may include parameters for providing one or two RSs (e.g., SSB, CSI-RS, SRS) for determining the UL transmission spatial filter for UL transmissions (e.g., a CG PUSCH, a DG PUSCH, and/or an SRS).

The QCL types of each DL RS may be given by the higher layer (e.g., the RRC layer) parameters for the at least one RS and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

Furthermore, a UE may be configured with a TCI state configuration containing parameters for determining the UL TX spatial filter for the UL transmissions. More specifically, if the signals transmitted from different antenna ports share similar, or the same, channel properties, the antenna ports may be considered as QCL signals. The QCL concept may be introduced to help the UE with a precise channel estimation, a frequency offset error estimation, and synchronization procedures. Furthermore, the spatial receiver parameters may include the properties associated with the received downlink signal angle of arrival at the UE. Thus, when one or more channels exhibit different QCL type D properties, the antenna ports that are quasi-co-located for the channel(s) may be geographically separated. For example, the physical antenna elements may belong to different TRPs. In the unified TCI framework, there may be three types of TCI states: (1) UL TCI states: these states specify the QCL properties among a set of UL channels. (2) DL TCI states: these states specify the QCL properties among a set of DL channels. (3) Joint TCI states: these states specify the QCL properties between the UL and DL channels. These types of TCI states collectively define the QCL relationships across different channel types in the system.

Unified TCI Framework

To facilitate more efficient (lower latency and overhead) DL/UL beam management to support a larger number of configured TCI states, a unified TCI framework for beam indication may bring some benefits of low complexity and simplified controlling mechanisms. More specifically, through the unified indication, DL or UL channels/signals may share the same indicated TCI state to reduce the signaling overhead, and different channels and/or reference signals may share similar channel properties. The unified indication may be used to indicate a common TCI state for DL channels (including a PDCCH, a PDSCH, and/or a DL reference signal), a common TCI state for UL channels (including a PUCCH, a PUSCH, and/or a UL reference signal), and/or a common TCI state for both DL and UL channels. For example, the common TCI state for DL channels/UL channels may include a scheme configured as 'separate' (e.g., DL TCI state, UL TCI state) and a common TCI state for both DL and UL channels may include a scheme configured as 'joint' (e.g., joint TCI state).

Inter-Cell Beam Management

For a UE, to receive/transmit data from/to different TRPs associated with different cells (including a serving cell and a non-serving cell) may not only result in improvements in the signaling maintenance, but may also facilitate the reliability enhancement. The inter-cell beam management may be indicated to a UE via pre-configuration, a configuration, RRC signaling, one or more DCI formats, or a MAC CE. Furthermore, whether to support inter-cell beam management may be reported by a UE via a UE capability message. In addition, the multi-DCI scheme may be used to indicate the beam information corresponding to a cell which is different from the serving cell. For example, a first DCI format corresponding to a first CORESET pool index (e.g., represented by the CORESETPoolIndex IE) may be used to indicate a beam for the serving cell, and a second DCI format corresponding to a second CORESET pool index may be used to indicate a beam for another cell that is different from the serving cell. To inform the UE with which cell a TRP is associated, a TCI configuration may include an indicator with an additional PCI index (e.g., represented by the additionalPCI IE). This indicator may be used to indicate that a TCI state, or QCL information, refers to a PCI, different from the serving cell's PCI. In this context, a set of additional PCI indices may correspond to a set of PCI values mapped to a set of indices. The additional PCI may correspond to a list of information for additional SSBs with PCIs that are different from the serving cell's PCI.

The TCI configuration may include various types of configurations. For example, the TCI configuration may be a DL TCI configuration (which may include a list of TCI states for DL channels/RSs), a UL TCI configuration (which may include a list of TCI states for UL channels/RSs), a unified TCI configuration (which may include a list of TCI states for both DL and UL channels/RSs), and/or a list of TCI states associated with various elements, such as a PDSCH, a CORESET, a PDCCH, an SSB, a CSI-RS, a UL power control parameter, a UL pathloss RS, a PRACH, a PUSCH, an SRS, a PUCCH, a BWP, and/or a serving cell configuration.

For a UE operating in an mTRP-based unified TCI framework, various implementations described in the present disclosure may be applied under different scenarios. These scenarios may include a single cell operation, an intra-band CA, an inter-band CA, an intra-node based LTM (e.g., intra-CU inter-DU LTM, intra-CU intra-DU LTM), and an inter-node based LTM (e.g., inter-CU LTM).

In the case of single cell operation, the implementations may apply when a UE is configured with a particular IE/list, such as the d-OrJointTCI-StateList IE or the UL-TCI-StateList IE, and/or when the TCI state(s) is activated in the activation command for the mTRP-based unified TCI framework.

In the case of intra-band CA, the implementations may apply when a UE is configured with a specific IE/list, such as the d-OrJointTCI-StateList IE or the UL-TCI-StateList IE, and/or the UE is configured for operation with CA in the same frequency band.

In the case of inter-band CA, the implementations may apply when the UE is configured for operation with CA in different frequency bands, and/or under the conditions of being configured with the d-OrJointTCI-StateList IE or the UL-TCI-StateList IE, and/or having TCI state(s) activated in the activation command for the mTRP-based unified TCI framework.

In the case of intra-node based LTM, the implementations may apply when a UE is configured with the d-OrJointTCI-StateList IE or the UL-TCI-StateList IE, when the TCI state(s) is activated in the activation command for the mTRP based unified TCI framework, and/or the UE is configured for operation with intra-node mobility.

In the intra-node mobility scenario, the serving cell and the target cell may operate on the same network node and may share the same MAC entity (e.g., in a CA scenario). The intra-node mobility scenario may be further classified into two cases: the intra-CU with intra-DU case and the intra-CU with inter-DU case.

In the intra-node mobility scenario, the serving cell and the target cell may share the same RRC layer and PDCP layer. Specifically, the serving cell and the target cell may be intra-CU. In the intra-CU with intra-DU case, the serving cell and the target cell may belong to the same DU and the same CU. For the intra-DU case, the serving cell and the target cell may share the same MAC entity and the RLC layer. In the intra-CU with inter-DU case, the serving cell and the target cell may belong to the same CU but may correspond to different DUs. The serving cell may include the source cell.

In the case of inter-node based LTM, the implementations may apply when a UE is configured with the d-OrJointTCI-StateList IE or the UL-TCI-StateList IE, when the TCI state(s) is activated in the activation command for the mTRP based unified TCI framework, and/or the UE is configured for operation with inter-node mobility.

In the inter-node mobility scenario, the serving cell and the target cell may operate on different network nodes. The UE may apply separate MAC entities to the serving cell and the target cell (e.g., in a DC scenario). The serving cell may include the special cell or the PCell and the target cell may include the special cell, the PSCell, or the SCell.

TRP/Panel Identification

In some implementations, different channels/resources/reference signals corresponding to the same TRP/panel may imply that these channels/resources/reference signals correspond to the same SRI, SRS resource set, Transmission Precoding Matrix Indicator (TPMI), DL TCI state, UL TCI state, CORESETPoolIndex, CORESET, CORESET group, TCI configuration, power control parameter, spatial relation information, search space, search space group, CSI-RS resource configuration, DMRS resource configuration, SRS resource configuration, reference signal indication, panel indication, and/or joint TCI state.

In some implementations, there may be no explicit indication in the TRP information, and a default beam may be determined based on a (pre-)configured/(pre-)determined rule.

In some implementations, the TCI configuration may include the unified TCI state type, the joint TCI state, the UL TCI state, and/or the DL TCI state.

In some implementations, the TCI configuration may include RRC parameters, such as the lists for adding or releasing the TCI states.

In some implementations, the TCI configuration may correspond to one or more scheduling configurations, such as the PDSCH configuration (e.g., represented by the PDSCH-Config IE), the PUSCH configuration (e.g., represented by the PUSCH-Confg IE), the PUCCH configuration (e.g., represented by the PUCCH-Config IE), the PUCCH configuration list (e.g., represented by the PUCCH-ConfigurationList IE), the CORESET configuration (e.g., represented by the CORESET-Config IE), and/or the PDCCH configuration (e.g., represented by the PDCCH-Config IE).

In some implementations, the TCI configuration may include TCI information, such as the TCI state index, the QCL type, the unified TCI framework triggering information, and/or the information of the multi-TRP scheme.

In some implementations, different channels/resources/reference signals corresponding to the same TRP/panel may imply that these channels/resources/reference signals are using the same spatial domain filter/setting to receive an SS/PBCH block. The UE may apply the same parameters to determine the same spatial domain filter for the channels/resources/reference signals corresponding to the same TRP/panel. For example, the same parameters may be included in the TCI state.

In some implementations, different channels/resources/reference signals corresponding to the same TRP/panel may imply that these channels/resources/reference signals are associated with a QCL assumption providing the same reference signal.

In some implementations, different channels/resources/reference signals corresponding to the same TRP/panel may imply that these channels/resources/reference signals are using the same spatial domain filter/setting to receive a periodic/semi-persistent/aperiodic CSI-RS resource. The UE may apply the same parameters to determine the same spatial domain filter for the channels/resources/reference signals corresponding to the same TRP/panel. For example, the same parameters may be included in the TCI state.

In some implementations, different channels/resources/reference signals corresponding to the same TRP/panel may imply that these channels/resources/reference signals are indicated to apply the same spatial TX/RX domain filter/setting for transmission to or reception from that corresponding TRP/panel In some implementations, different channels/resources/reference signals corresponding to the same TRP/panel may imply that these channels/resources/reference signals are using the same spatial domain filter/setting to transmit an SRS. The SRS resource may serve various purposes, including beam management, codebook-based channel sounding, non-codebook-based channel sounding, and/or antenna switching. Among these purposes, beam management may be the preferred application for the SRS resource.

In some implementations, different channels/resources corresponding to the same TRP/panel may imply that these channels/resources/reference signals are using the same spatial domain filter/setting to receive the PDCCH(s) corresponding to the same CORESET ID or the same CORESET group.

In some implementations, different channels/resources corresponding to the same TRP/panel may imply that these channels/resources/reference signals are using the same spatial domain filter/setting to receive the PDCCH(s) in which the associated CORESET index(es) correspond to the same CORESET pool index.

In some implementations, different channels/resources corresponding to the same TRP/panel may imply that these channels/resources/reference signals are indicated to apply the same set of power control parameters.

In some implementations, the power control parameters may include the pathloss RS, the Transmit Power Control (TPC) command, the P0 value, the alpha value, and/or the close loop index.

In some implementations, different channels/resources corresponding to the same TRP/panel may imply that these channels/resources/reference signals are associated with the same BFD RS set.

Unified TCI Indication

In some implementations, the unified indication may include a common DL beam indication, a common UL beam indication, and/or a joint DL/UL beam indication. Specifically, the beam indication may include the TRP/panel indication.

In some implementations, the common DL beam indication (or the separate DL beam indication) may correspond to the same DL TCI state, the same QCL assumption information, the same CORESET index, the same CORESET pool index, the same search space index, the same search space group index, the same group index, the same RS index, the same BFD RS index/set, and/or the same DL/Joint TCI state.

In some implementations, the common UL beam indication (or the separate UL beam indication) may correspond to the same UL TCI state, the same SRS resource set, the same spatial relation information, the same power control set, the same CORESET index, the same CORESET pool index, the same search space index, the same search space group index, the same group index, the same RS index, and/or the same DL/Joint TCI state.

In some implementations, the joint DL/UL beam indication may correspond to the same group index, and/or the same DL/Joint TCI state.

In some implementations, the unified indication may correspond to multiple activated/configured TCI states. Preferably, the activated/configured TCI states may correspond to a group specific to the unified TCI framework. The UE may receive the unified indication via an RRC message, A MAC CE and/or a DCI format from the serving cell. Preferably, the serving cell may include a PCell, a PSCell, an SPcell, an SCell, and/or a cell with a PCI which is different from the PCell's PCI.

In some implementations, the reference unified TCI state may be used to provide the applicable TCI state where the TCI state is not present in a BWP of a serving cell received from a reference BWP of a reference serving cell. The reference unified TCI state may be a DL TCI state, a UL TCI state, a joint TCI state, a list of DL TCI states, a list of UL TCI states, or a list of joint TCI states.

RRC Signaling

In some implementations, RRC signaling may include more than one TCI state corresponding to different QCL type D properties. These TCI states may include DL TCI states, UL TCI states, and/or joint TCI states.

In some implementations, RRC signaling may include a parameter to indicate which TCI state (e.g., a first TCI state, a second TCI state, both TCI states, or none of the TCI states) is applied.

In some implementations, the RRC signaling may include more than one TCI state corresponding to a single channel/RS.

In some implementations, RRC signaling may include one or more TCI state(s) in RRC pre-configuration.

In some implementations, RRC signaling may include more than one TCI state for a single cell.

In some implementations, RRC signaling may include more than one TCI state for more than one serving cell.

In some implementations, RRC signaling may include more than one TCI state for the serving cell and/or the target cell.

MAC CE

In some implementations, a MAC CE may include an activation command and may include more than one TCI state index.

In some implementations, a MAC CE may activate one or more TCI states corresponding to the same QCL type D properties.

In some implementations, a MAC CE may activate one or more TCI states corresponding to more than one QCL type D property.

In some implementations, a MAC CE may deactivate one or more TCI states if the corresponding channel/RS is with more than one QCL type D property.

UE Behavior for Single Cell Operation or Operation with CA in the Same Frequency Band A UE may employ various strategies to monitor the PDCCH candidates in overlapping PDCCH monitoring occasions across multiple CORESETs on the active DL BWP(s) of one or more cells in the case of single cell operation or in the case of operation with CA in the same frequency band.

In some implementations, the UE may monitor the PDCCH candidates in overlapping PDCCH monitoring occasions in multiple CORESETs that have been configured with at least one same QCL type D property on the active DL BWP(s) of one or more cells.

In some implementations, the UE may monitor the PDCCH candidates in overlapping PDCCH monitoring occasions in multiple CORESETs that have been configured with at least the same number of QCL type D properties (e.g., the CORESETs that have been configured with two TCI states/QCL type D properties, the CORESETs that have been configured with only one TCI state/QCL type D property, or the CORESETs that have been configured with four TCI states/QCL type D properties) and configured with the same or different QCL type D properties on the active DL BWP(s) of one or more cells.

In some implementations, the UE may monitor the PDCCH candidates in overlapping PDCCH monitoring occasions in multiple CORESETs that correspond to more than one QCL type D property on the active DL BWP(s) of one or more cells.

In some implementations, the UE may monitor the PDCCH candidates in overlapping PDCCH monitoring occasions in a first CORESET that has been configured with more than one QCL type D property, and then monitor the PDCCH candidates in overlapping PDCCH monitoring occasions in other CORESETs that have been configured with the same QCL type D properties as the first CORESET.

In some implementations, if the UE monitors a CORESET with only one QCL type D property, the UE may subsequently monitor other CORESET(s) with different QCL type D properties. For example, if the UE monitors the PDCCH candidates in overlapping PDCCH monitoring occasions in a first CORESET that has been configured with only one QCL type D property, the UE may further monitor the PDCCH candidates in the overlapping PDCCH monitoring occasions in other CORESETs that have been configured with different QCL type D properties from the only one QCL type D property.

UE Behavior for Operation with CA in Different Frequency Bands or LTM

A UE may employ various strategies to monitor the PDCCH candidates in overlapping PDCCH monitoring occasions across multiple CORESETs on the active DL BWP(s) of one or more cells in the case of operation with CA in different frequency bands or LTM.

In some implementations, the UE may monitor the PDCCH candidates in overlapping PDCCH monitoring occasions in multiple CORESETs that have been configured with more than two QCL type D properties on the active DL BWP(s) of one or more cells.

In some implementations, the UE may monitor the PDCCH candidates in overlapping PDCCH monitoring occasions in multiple CORESETs that have been configured with at most two QCL type D properties on the active DL BWP(s) of the serving cell and may monitor, on the target cell or a cell other than the serving cell, PDCCH candidates in overlapping PDCCH monitoring occasions in multiple CORESETs that have been configured with at least one same QCL type D property as that of the serving cell.

In some implementations, the UE may monitor the PDCCH candidates in overlapping PDCCH monitoring occasions in multiple CORESETs that have been configured with at most one first QCL type D property on the active DL BWP(s) of the serving cell and may monitor, on the target cell or a cell other than the serving cell, PDCCH candidates in overlapping PDCCH monitoring occasions in multiple CORESETs that have been configured with at most one second QCL type D property different from the first QCL type D property.

In some implementations, the UE may monitor the PDCCH candidates in overlapping PDCCH monitoring occasions in multiple CORESETs with a particular monitoring priority.

BS Behavior for Single Cell Operation or for Operation with CA in the Same Frequency Band In some implementations, a BS/NW may configure the PDCCH candidates in overlapping PDCCH monitoring occasions in multiple CORESETs with at least one same QCL type D property on the active DL BWP(s) of one or more cells.

In some implementations, a BS/NW may configure the PDCCH candidates in overlapping PDCCH monitoring occasions in multiple CORESETs on the active DL BWP(s) of one or more cells. These CORESETs may be configured with at least the same number of QCL type D properties, which may be either the same or different across the CORESETs.

In some implementations, a BS/NW may configure the PDCCH candidates in overlapping PDCCH monitoring occasions in multiple CORESETs that correspond to more than one QCL type D property on the active DL BWP(s) of one or more cells.

BS Behavior for Operation with CA in Different Frequency Band or LTM

In some implementations, a BS/NW may configure the PDCCH candidates in overlapping PDCCH monitoring occasions in multiple CORESETs that have been configured with more than two QCL type D properties on the active DL BWP(s) of one or more cells.

In some implementations, a BS/NW may configure the PDCCH candidates in overlapping PDCCH monitoring occasions in multiple CORESETs that have been configured with at most two QCL type D properties on the active DL BWP(s) of the serving cell and may configure, on the target cell or a cell other than the serving cell, the PDCCH candidates in overlapping PDCCH monitoring occasions in multiple CORESETs that have been configured with at least one QCL type D property identical to that of the serving cell In some implementations, a BS/NW may configure the PDCCH candidates in overlapping PDCCH monitoring occasions in multiple CORESETs that have been configured with at most one first QCL type D property on the active DL BWP(s) of the serving cell and may configure, on the target cell or a cell other than the serving cell, the PDCCH candidates in overlapping PDCCH monitoring occasions in multiple CORESETs that have been configured with at most one second QCL type D property that is different from the first QCL type D property.

RRC Signaling for QCL-TypeD

In some implementations, RRC signaling may include more than one TCI state corresponding to different QCL type D properties.

An RRC configuration or an IE may configure a list of TCI states, with each TCI state having a TCI State ID corresponding to the IE or one or more QCL information IEs. The QCL information may include a cell index, a BWP index, an associated reference signal (e.g., a CSI-RS or an SSB), and a QCL type (e.g., represented by the qcl-Type IE) set to 'typeD'.

Different QCL type D properties may include different DL/joint TCI state IDs, different UL TCI state IDs, different spatial relation IDs, different reference signals, and/or different QCL information.

In some implementations, the RRC signaling may include several IEs, such as the ControlResourceSet IB, the PDSCH-Config IB, the PUCCH-Config IB, the BWP-UplinkDedicated IB, the BWP-DownlinkDedicated IB, the ServingCellConfig IE, the SpCellConfig IE, the SCellConfig IB, and/or the CellGroupConfig IB.

In some implementations, multiple TCI states may include DL TCI states, UL TCI states, and/or joint TCI states. In some implementations, the DL TCI state(s) and the joint TCI state(s) may be configured as a particular IE, such as the dl-OrJointTCI-State IE. The UL TCI state(s) may be configured as another IE, such as the spatialRelationInfo IE or the TCI-UL-State IB.

In some implementations, the RRC signaling may include an RRC parameter indicating which TCI state (e.g., the first TCI state, the second TCI state, both TCI states, and/or none of the TCI states) is applied, for example, when two TCI states are configured.

In some implementations, the RRC parameter may be applied to a CORESET, a PDSCH, a PUCCH, a PUSCH, and/or a reference signal (e.g., an SSB, a CSI-RS, a TRS, a PTRS, or an SRS).

When multiple TCI states are configured, not all the TCI states may always be applied to the associated resources/channels/RSs. Thus, the RRC parameter may be used to indicate one of the TCI states, some of the TCI states, all the TCI states, or none of the TCI states to the associated resources/channels/RSs.

If a CORESET, a physical channel (e.g., a PDSCH, a PUCCH, a PUSCH) or an RS (e.g., an SSB, a CSI-RS) is configured with multiple TCI states, the UE may be configured with an RRC parameter used to indicate one of the configured TCI states, some of the configured TCI states, all the configured TCI states, or none of the configured TCI states to be applied to the reception of the CORESET/physical channel/RS and/or the transmission of the physical channel/RS.

In some implementations, RRC signaling may include multiple TCI states corresponding to a single resource/channel/RS.

In some implementations, an RRC parameter (or an IE) may indicate an mTRP operation for the resource/channel/RS.

In some implementations, an RRC parameter (or an IE) may indicate an mTRP operation and a unified TCI framework for a resource/channel/RS. For example, the RRC parameter or IE may indicate the UE whether to use the indicated DL/joint/UL TCI state(s) for the resource/channel/RS.

In some implementations, an RRC pre-configuration may include one or more TCI states. The RRC pre-configuration may be included in an RRC Reconfiguration message, or in an RRC message for the LTM operation.

In some implementations, the configured TCI state(s) may be specific to a resource/channel/RS.

In some implementations, RRC signaling may include multiple TCI states for a single cell. The cell may be a PCell, a PSCell, an SCell, or an SpCell.

In some implementations, RRC signaling may include multiple TCI states for multiple cells. In some implementations, the multiple cells may include the serving cells. In some implementations, the multiple cells may include the serving cell, the target cell, and/or one or more cells other than the serving cell.

In some implementations, the TCI state(s) specific to each cell may correspond to the same QCL-Type D properties, or to different QCL-Type D properties, when the multiple cells are serving cells, or where the serving cells may be in the same frequency band or in different frequency bands.

In some implementations, the TCI state(s) specific to each cell may correspond to different QCL-Type D properties when the multiple cells include the target cell or a cell other than the serving cell.

MAC CE for QCL-TypeD

In some implementations, a MAC CE may include an activation command and also include multiple TCI state indices.

In some implementations, the MAC CE may include one or more fields for TCI state activation/indication. These fields may include at least one of the following: a serving cell ID, a DL BWP ID, a UL BWP ID, a CORESET ID, a CORESET Pool Index, a field indicating whether a TCI codepoint has multiple TCI states or a single TCI state, a field indicating whether the TCI state ID in the same octet is for a joint/DL TCI state or a UL TCI state, a TCI state ID, or a reserved bit.

In some implementations, the TCI state indices (e.g., two TCI states indices) may correspond to a pair of activated TCI states for different TRPs.

In some implementations, a MAC CE may include a cell switch command (e.g., an LTM cell switch command MAC CE) and/or a TCI state command.

In some implementations, the cell switch command may also include a TCI state activation command.

In some implementations, the TCI state command may include a Candidate Cell TCI States Activation/Deactivation MAC CE.

In some implementations, the TCI state indices may correspond to the activated/indicated TCI states for one or more target cell.

In some implementations, when the TCI state command (e.g., the Candidate Cell TCI States Activation/Deactivation MAC CE) corresponds to the deactivation status, the UE may stop monitoring one or more resources/RSs/channels in the overlapping resources/RSs/channels.

In some implementations, a MAC CE may activate one or more TCI states corresponding to the same QCL-Type D property(ies).

In some implementations, if the overlapping resources/channels/RSs correspond to the same QCL-Type D property(ies) (e.g., the same TCI state ID), the field referring to the certain TCI state in the MAC CE for activating the TCI state for the overlapping resources/channels/RSs may be set to '1'.

In some implementations, the field in the MAC CE for activating/deactivating the TCI state for the overlapping resources/channels/RSs, which corresponds to QCL-Type D properties different from the certain TCI state, may be set to '0'.

In some implementations, a MAC CE may activate one or more TCI states corresponding to multiple QCL-Type D properties.

In some implementations, the field in the MAC CE for activating the TCI states may be set to '1'.

In some implementations, the number of the TCI states may be at most two or four.

In some implementations, the number of the TCI states may be based on the number of configured serving cells in the CA operation.

In some implementations, the number of the TCI states may be determined based on the number of the configured target cells.

In some implementations, a MAC CE may deactivate one or more TCI states if the corresponding channel(s)/RS(s) is (are) associated with multiple QCL-Type D properties.

In some implementations, the overlapping resources, channels, or RSs may correspond to a number of different QCL-Type D properties that exceeds a predefined threshold (e.g., the predefined threshold for the number of different QCL-Type D properties may be set at various values, such as 2, 4, the number of serving cells, or the number of target cells). When such a situation exists, the MAC CE may be employed to deactivate one or more TCI states, such that to reduce the number of different QCL-Type D properties and to make the number of different QCL-Type D properties align with the predefined threshold.

In some implementations, a field in the MAC CE for deactivating the TCI state(s) may be set to '0'.

In some implementations, a field in the MAC CE may be used to deactivate a specific TCI state indicated in the MAC CE.

In some implementations, a field in the MAC CE may be used to deactivate all the TCI states (e.g., multiple TCI states) indicated in the MAC CE.

In some implementations, the Candidate Cell TCI States Activation/Deactivation MAC CE may include one or more fields that indicate one or more TCI states for the target cell. The structure of the MAC CE may vary in different implementations. In some implementations, the MAC CE may include 128 or 64 fields, each corresponding to the activation or deactivation status of a specific TCI state ID. In some implementations, the MAC CE may include two distinct fields: one for indicating the TCI state ID, and another for specifying its activation or deactivation status.

UE Behavior for QCL-Type D

A UE may receive RRC signaling for receiving the QCL-Type D information.

A UE may receive a MAC CE for receiving a TCI state activation/deactivation command.

A UE may receive the DCI that indicates the TCI state.

A UE monitoring a resource/channel/RS may imply that the UE receives or decodes the resource/channel/RS.

Each of the first resource/channel/RS and the second resource/channel/RS may refer to a single resource/channel/RS or a set of resources/channels/RSs in the present disclosure.

A UE may monitor resources/channels/RSs in multiple overlapping resources/channels/RSs that have been configured with at least one identical QCL-Type D property on the active DL BWP(s) or UL BWP(s) of one or more cells.

In some implementations, a UE may monitor the PDCCH candidates in the overlapping PDCCH monitoring occasions in multiple CORESETs that have been configured with at least one identical QCL-Type D property on the active DL BWP(s) of one or more cells.

In some implementations, if a first resource/channel/RS is configured with a first QCL-Type D property, the UE may extend its monitoring to other resources/channels/RSs that also possess the first QCL type D property. These other resources/channels/RSs may additionally be configured with different QCL type D properties beyond the first QCL type D property that is shared with the first resource/channel/RS. In some scenarios where multiple resources/channels/RSs are configured with at least the first QCL type D property, the UE may employ a structured approach to monitor the resources/channels/RSs. This approach may follow certain conditions or priorities, such as the ascending or descending order of the CORESET indices, the ascending order of the cell indices, the ascending order of the search space set indices, or by prioritizing the Common Search Space (CSS) over the UE-specific Search Space (USS).

If a first resource/channel/RS is configured with a first QCL type D property, the UE may monitor other resources/channels/RSs that are configured (only) with the same first QCL type D property. In scenarios where multiple resources/channels/RSs are configured with the first QCL type D property, the UE may adopt a structured approach to monitor the resources/channels/RSs. Such an approach may follow a predetermined order based on certain conditions or priorities. For example, the UE may monitor the resources/channels/RSs according to the ascending or descending order of the CORESET indices, the ascending order of the cell indices, the ascending order of the search space set indices, or by prioritizing the monitoring of the CSS over the USS.

In some implementations, the same QCL type D properties may refer to the same TCI state ID or may correspond to the same reference signal.

In some implementations, the first resource/channel/RS may correspond to a CSS set with the lowest index in a cell with the lowest index containing the CSS sets. If no cells contain CSS sets, the first resource/channel/RS may correspond to a USS set with the lowest index in a cell with the lowest index. In some implementations, the UE may monitor the resource/channel/RS corresponding to the CSS set in all the configured cells before monitoring the resource/channel/RS corresponding to the USS set. In some implementations, the UE may monitor the resource/channel/RS corresponding to the CSS set in the cell with the lowest index, and then monitor the resource/channel/RS corresponding to the USS set in the cell with the lowest index. In other words, the UE may monitor the resource/channel/RS corresponding to the search space in the cell with lowest index first, and then monitor the resource/channel/RS corresponding to the CSS set before the resource/channel/RS corresponding to the USS set. In some implementations, the UE may monitor the resource/channel/RS corresponding to the CORESET with the lowest index in the cell with the lowest index containing the CSS sets.

In some implementations, a UE may monitor resources/channels/RSs in multiple overlapping resources/channels/RSs that have been configured with at least the same number of QCL type D properties and that have been configured with the same or different QCL type D properties on the active DL BWP(s) or UL BWP(s) of one or more cells.

In some implementations, a UE may monitor the PDCCH candidates in overlapping PDCCH monitoring occasions in multiple CORESETs that have been configured with at least the same number of QCL type D properties and that have been configured with the same or different QCL type D properties on the active DL BWP(s) of one or more cells.

In some implementations, when a first resource/channel/RS is configured with a first number of QCL type D properties, the UE may monitor other resources/channels/RSs that are configured with a second number of QCL type D properties, where the first number may be the same as the second number. In some implementations, at least one of the first number of QCL type D properties may be the same as at least one of the second number of QCL type D properties. In some implementations, the first number of QCL type D properties may be different from the second number of QCL type D properties.

In some implementations, the first resource/channel/RS may correspond to the CSS set with the lowest index in the cell with the lowest index containing the CSS sets. If no such CSS set exists, the first resource/channel/RS may correspond to the USS set with the lowest index in the cell with the lowest index. In some implementations, the UE may monitor the resource/channel/RS corresponding to the CSS set in all the configured cells before monitoring the resource/channel/RS corresponding to the USS set. In some implementations, the UE may monitor the resource/channel/RS corresponding to the CSS set in the cell with the lowest index, and then monitor the resource/channel/RS corresponding to the USS set in the same cell. In other words, the UE may first monitor the resource/channel/RS corresponding to the search space in the cell with the lowest index, and then monitor the resource/channel/RS corresponding to the CSS set before the resource/channel/RS corresponding to the USS set. In some implementations, the UE may monitor the resource/channel/RS corresponding to the CORESET with the lowest index in the cell with the lowest index containing the CSS sets.

In some implementations, a UE may monitor resources/channels/RSs in multiple overlapping resources/channels/RSs that correspond to more than one QCL type D property on the active DL/UL BWP(s) of one or more cells.

In some implementations, a UE may monitor the PDCCH candidates in the overlapping PDCCH monitoring occasions in multiple CORESETs that correspond to more than one QCL type D property on the active DL BWP(s) of one or more cells.

In some implementations, when a first resource is configured with a single QCL type D property and a second resource is configured with two or more QCL type D properties, the UE may only monitor the second resource.

In some implementations, when a first resource/channel/RS is configured with only one QCL type D property and a second resource/channel/RS is configured with two or more QCL type D properties, the UE may monitor the second resource first, and then monitor the first resource if the only one QCL type D property is the same as one of the two or more QCL type D properties of the second resource.

In some implementations, the second resource/channel/RS may correspond to the CSS set with the lowest index in the cell with the lowest index containing CSS sets. If no such set exists, it may correspond to the USS set with the lowest index in the cell with the lowest index. In some implementations, the UE may monitor the resource/channel/RS corresponding to the CSS set in all configured cells before monitoring the resource/channel/RS corresponding to the USS set. In some implementations, the UE may monitor the resource/channel/RS corresponding to the CSS set in the cell with the lowest index, and then monitor the resource/channel/RS corresponding to the USS set in the same cell. In other words, the UE may first monitor the resource/channel/RS corresponding to the search space in the cell with the lowest index, and then monitor the resource/channel/RS corresponding to the CSS set prior to the resource/channel/RS corresponding to the USS set. In some implementations, the UE may monitor the resource/channel/RS corresponding to the CORESET with the lowest index in the cell with the lowest index containing CSS sets.

In some implementations, if a UE monitors a first resource/channel/RS in multiple overlapping resources/channels/RSs that have been configured with first QCL type D properties, the UE may further monitor any other resources/channels/RSs in multiple overlapping resources/channels/RSs that have been configured with second QCL type D properties that are different from the first QCL type D properties.

In some implementations, if a UE monitors PDCCH candidates in overlapping PDCCH monitoring occasions in a first CORESET that have been configured with first QCL type D properties, the UE may further monitor the PDCCH candidates in overlapping PDCCH monitoring occasions in any other CORESETs that have been configured with second QCL type D properties that are different from the first QCL type D properties.

In some implementations, the UE may monitor at most two different QCL type D properties in overlapping resources/channels/RSs.

In some implementations, the first resource/channel/RS may correspond to the CSS set with the lowest index in the cell with the lowest index among the cells containing CSS sets. If no such CSS set exists, the first resource/channel/RS may correspond to the USS set with the lowest index among the USS sets in the cell with the lowest index among the cells containing the USS sets. A second resource/channel/RS other than the first resource/channel/RS may correspond to the CSS set with the lowest index among the CSS sets in the cell with the second-lowest index among the cells containing the CSS sets. If no such CSS set exists, the second resource/channel/RS may correspond to the USS set with the lowest index among the USS sets in the cell with the lowest index among the cells containing the USS sets or to the USS set with the lowest index among the USS sets in the cell with the second-lowest index among the cells containing the USS sets. In some implementations, the UE may monitor the resource/channel/RS corresponding to the CSS set in all configured cells before monitoring the resource/channel/RS corresponding to the USS set. In some implementations, the UE may monitor the resource/channel/RS corresponding to the CSS set in the cell with the lowest index among the cells containing the CSS sets, and then monitor the resource/channel/RS corresponding to the USS set in the same cell. In other words, the UE may first monitor the resource/channel/RS corresponding to the search space in the cell with the lowest index among the cells containing the CSS sets, and then monitor the resource/channel/RS corresponding to the CSS set prior to the resource/channel/RS corresponding to the USS set. In some implementations, the UE may monitor the resource/channel/RS corresponding to the CORESET with the lowest index among the CORESETs in the cell with the lowest index among the cells containing CSS sets and USS sets.

In some implementations, the first resource/channel/RS may correspond to the CSS set with the lowest index among CSS sets in the cell with the lowest index among the cells containing CSS sets. If no such set exists, the first resource/channel/RS may correspond to the USS set with the lowest index among USS sets in the cell with the lowest index among the cells containing the USS sets. A second resource/channel/RS other than the first resource/channel/RS may correspond to the CSS set with the second-lowest index among CSS sets in the cell with the lowest index among the cells containing CSS sets. If no such set exists, the second resource/channel/RS may correspond to the USS set with the lowest index in the cell with the lowest index among the cells containing the USS sets or may correspond to the USS set with the second-lowest index among the USS sets in the cell with the lowest index among the cells containing the USS sets. In some implementations, the UE may monitor the resource/channel/RS corresponding to the CORESET with the lowest index among CORESETs in the cell with the lowest index among the cells containing CSS sets and USS sets.

In some implementations, a UE may monitor resources/channels/RSs in multiple overlapping resources/channels/RSs that have been configured with more than two QCL type D properties on the active DL BWP(s) or UL BWP(s) of one or more cells.

In some implementations, a UE may monitor the PDCCH candidates in overlapping PDCCH monitoring occasions in multiple CORESETs that have been configured with more than two QCL type D properties on the active DL BWP(s) of one or more cells.

In some implementations, a UE may receive RRC signaling (e.g., an RRC parameter/IE). The RRC signaling may enable the UE to determine the number of different QCL type D properties corresponding to the resources/channels/RSs that the UE may monitor.

In some implementations, a UE may report its UE capability to inform the BS of the number of different QCL type D properties corresponding to the resources/channels/RSs that the UE may monitor.

In some implementations, the resources/channels/RSs may be an SFN based transmission/reception and/or a Coherent Joint Transmission (CJT).

In some implementations, a UE may monitor a first resource/channel/RS associated with a first cell that has been configured with first QCL type D properties and monitor any other resources/channels/RSs associated with a second cell that have been configured with second QCL type D properties and third QCL type D properties that are all different from the first QCL type D properties.

In some implementations, a UE may first monitor a first resource/channel/RS associated with a first cell that has been configured with first QCL type D properties, and further monitor any other resources/channels/RSs associated with a second cell or target cell that have been configured with second QCL type D properties that are different from the first QCL type D properties.

In some implementations, the first cell may include a PCell or a SpCell. The second cell may include an SCell, a cell other than the serving cell, or a target cell.

In some implementations, a UE may monitor a first resource/channel/RS associated with a first cell that has been configured with first QCL type D properties and monitor any other resources/channels/RSs associated with a second cell that have been configured with second QCL type D properties that are the same as the first QCL type D properties and third QCL type D properties that are different from the first QCL type D properties.

In some implementations, a UE may monitor a first resource/channel/RS associated with a first cell that has been configured with first QCL type D properties and second QCL type D properties and monitor any other resources/channels/RSs associated with a second cell that have been configured with third QCL type D properties and fourth QCL type D properties that are different from the first QCL type D properties and the second QCL type D properties.

In some implementations, a UE may monitor a first resource/channel/RS associated with a first cell that has been configured with first QCL type D properties and second QCL type D properties and monitor any other resources/channels/RSs associated with a second cell that have been configured with third QCL type D properties that are the same as either the first QCL type D properties or the second QCL type D properties, and fourth QCL type D properties that are different from the first QCL type D properties and the second QCL type D properties.

In some implementations, a UE may monitor resources/channels/RSs in multiple overlapping resources/channels/RSs with a particular monitoring priority.

In some implementations, a UE may monitor the PDCCH candidates in overlapping PDCCH monitoring occasions in multiple CORESETs with a particular monitoring priority.

In some implementations, the monitoring priority may be determined based on the cell index, the CORESET index, the CSS set index, the USS set index, and/or the priority index.

In some implementations, the cell with a lower index may correspond to a higher monitoring priority.

In some implementations, the CORESET with a lower index may correspond to a higher monitoring priority.

In some implementations, the CSS set index with a lower index may correspond to a higher monitoring priority.

In some implementations, the USS set index with a lower index may correspond to a higher monitoring priority.

In some implementations, the CSS may correspond to a higher monitoring priority.

In some implementations, the priority index with a lower value (e.g., priority index 0) may correspond to a higher monitoring priority.

In some implementations, the priority index with a higher value (e.g., priority index 1) may correspond to a higher monitoring priority.

In some implementations, the monitoring priority may be predefined or configured for the UE (e.g., via RRC signaling). Upon receiving the information of the monitoring priority, the UE may determine the monitoring priority based on the information. Afterwards, the UE may monitor the resources/channels/RSs in multiple overlapping resources/channels/RSs with the determined monitoring priority. In some implementations, the RRC signaling may include an RRC pre-configuration, an RRC Reconfiguration message, and/or one or more particular IEs (e.g., the ServingCellConfigCommonSIB IE, the PDCCH-ConfigSIB1 IE, and/or the PDCCH-ConfigCommon IE).

BS Behavior for QCL-TypeD

In some implementations, a BS/NW may transmit RRC signaling to configure the TCI state information.

In some implementations, a BS/NW may transmit a MAC CE to activate or deactivate the TCI state information.

In some implementations, a BS/NW may transmit DCI to indicate the TCI state information.

In some implementations, a BS/NW may configure resources/channels/RSs in multiple overlapping resources/channels/RSs that have been configured with at least one identical QCL type D property on the active DL BWP(s) or UL BWP(s) of one or more cells.

In some implementations, a BS/NW may configure the PDCCH candidates in overlapping PDCCH monitoring occasions in multiple CORESETs that have been configured with at least one identical QCL type D property on the active DL BWP(s) of one or more cells.

In some implementations, a BS/NW may configure resources/channels/RSs in multiple overlapping resources/channels/RSs that have been configured with at least the same number of QCL type D properties and configured with the same or different QCL type D properties on the active DL BWP(s) or UL BWP(s) of one or more cells.

In some implementations, a BS/NW may configure the PDCCH candidates in overlapping PDCCH monitoring occasions in multiple CORESETs that have been configured with at least the same number of QCL type D properties and configured with the same or different QCL type D properties on active DL BWP(s) of one or more cells.

In some implementations, the same number of QCL type D properties in the configuration information may imply that all resources/channels/RSs in the configured cells are configured with the same scheme. In some implementations, all configured cells may be configured with an sTRP scheme. In some implementations, all resources/channels/RSs may be configured with an mTRP scheme. In some implementations, all resources/channels/RSs may be configured with an SFN scheme. In some implementations, all resources/channels/RSs may be configured with an SDM scheme. In some implementations, all resources/channels/RSs may be configured with a CJT scheme.

In some implementations, a BS/NW may configure resources/channels/RSs in multiple overlapping resources/channels/RSs that correspond to more than one QCL type D property on the active DL BWP(s) or UL BWP(s) of one or more cells.

In some implementations, a BS/NW may configure the PDCCH candidates in overlapping PDCCH monitoring occasions in multiple CORESETs that correspond to more than one QCL type D property on the active DL BWP(s) of one or more cells.

In some implementations, a BS/NW may configure resources/channels/RSs in multiple overlapping resources/channels/RSs that correspond to more than two different QCL type D properties on the active DL BWP(s) or UL BWP(s) of one or more cells.

In some implementations, a BS/NW may configure resources/channels/RSs in multiple overlapping resources/channels/RSs that have been configured with at most two QCL type D properties on the active DL BWP(s) or UL BWP(s) of a serving cell. The BS/NW may also configure resources/channels/RSs in multiple overlapping resources/channels/RSs that have been configured with at least one QCL type D property identical to that of the serving cell on the configured/active DL BWP(s) or UL BWP(s) of the target cell or a cell other than the serving cell.

In some implementations, a BS/NW may configure the PDCCH candidates in overlapping PDCCH monitoring occasions in multiple CORESETs that have been configured with at most two QCL type D properties on the active DL BWP(s) of a serving cell. The BS/NW may also configure the PDCCH candidates in overlapping PDCCH monitoring occasions in multiple CORESETs that have been configured with at least one QCL type D property identical to that of the serving cell on configured/active DL BWP(s) of a target cell or a cell other than the serving cell.

In some implementations, the overlapping resources/channels/RSs may be associated with different cells.

In some implementations, a BS/NW may configure resources/channels/RSs in multiple overlapping resources/channels/RSs that have been configured with at most a first QCL type D property on the active DL BWP(s) or UL BWP(s) of a serving cell. The BS/NW may also configure resources/channels/RSs in multiple overlapping resources/channels/RSs that have been configured with at most a second QCL type D property that is different from the first QCL type D property on the configured/active DL BWP(s) or UL BWP(s) of the target cell or a cell other than the serving cell.

In some implementations, a BS/NW may configure the PDCCH candidates in overlapping PDCCH monitoring occasions in multiple CORESETs that have been configured with at most a first QCL type D property on the active DL BWP(s) of a serving cell. The BS/NW may also configure the PDCCH candidates in overlapping PDCCH monitoring occasions in multiple CORESETs that have been configured with at most a second QCL type D property that is different from the first QCL type D property on the configured/active DL BWP(s) of a target cell or a cell other than the serving cell.

FIG. 1 is a flowchart illustrating method/process 100 for receiving DL signaling from a BS, according to an example implementation of the present disclosure. Although actions 102, 104, 106, and 108 are illustrated, as separate actions, represented as independent blocks in FIG. 1, these separately illustrated actions should not be construed as to be necessarily order-dependent. The order in which the actions are performed in FIG. 1 is not intended to be construed as a limitation, and any number of the disclosed blocks may be combined in any order to implement the method, or an alternative method. Each of actions 102, 104, 106, and 108 may be performed independent of the other actions, and may be omitted in some implementations of the present disclosure. Moreover, method/process 100 may be combined with other procedures/methods described in the present disclosure. Method/process 100 may be performed by a UE, with each action of process 100 corresponding to an operation executed by the UE.

In action 102, process 100 may start by receiving, from the BS, via an RRC message, a configuration of multiple CORESETs that overlap in the time domain.

In action 104, process 100 may select a first CORESET from the CORESETs based on the configuration. In some implementations, selecting the first CORESET may include the UE selecting, among the CORESETS overlapping in the time domain, a CORESET having a lowest CSS set index and a lowest CC index, as the first CORESET.

In action 106, process 100 may select a second CORESET from the CORESETs by performing a set of operations. The set of operations will be discussed in detail below with reference to FIG. 2.

In action 108, process 100 may monitor, at least, the first CORESET and the second CORESET to receive the DL signaling from the BS. Process 100 may then end.

In some implementations, the UE may further select a third CORESET from the CORESETs the overlap in the time domain. In this case, the UE may monitor the first CORESET, the second CORESET, and the third CORESET to receive the DL signaling from the BS. The third CORESET may be associated with at least one QCL type D property that is the same as the QCL type D property that is associated with the first CORESET when the first CORESET is associated with only one QCL type D property.

In some implementations, the first CORESET may be configured in a first cell and the second CORESET may be configured in a second cell. The second cell may be different from the first cell. For example, the second cell may be a target cell for a handover procedure, while the first cell may be a source cell for the handover procedure.

Figure 2:
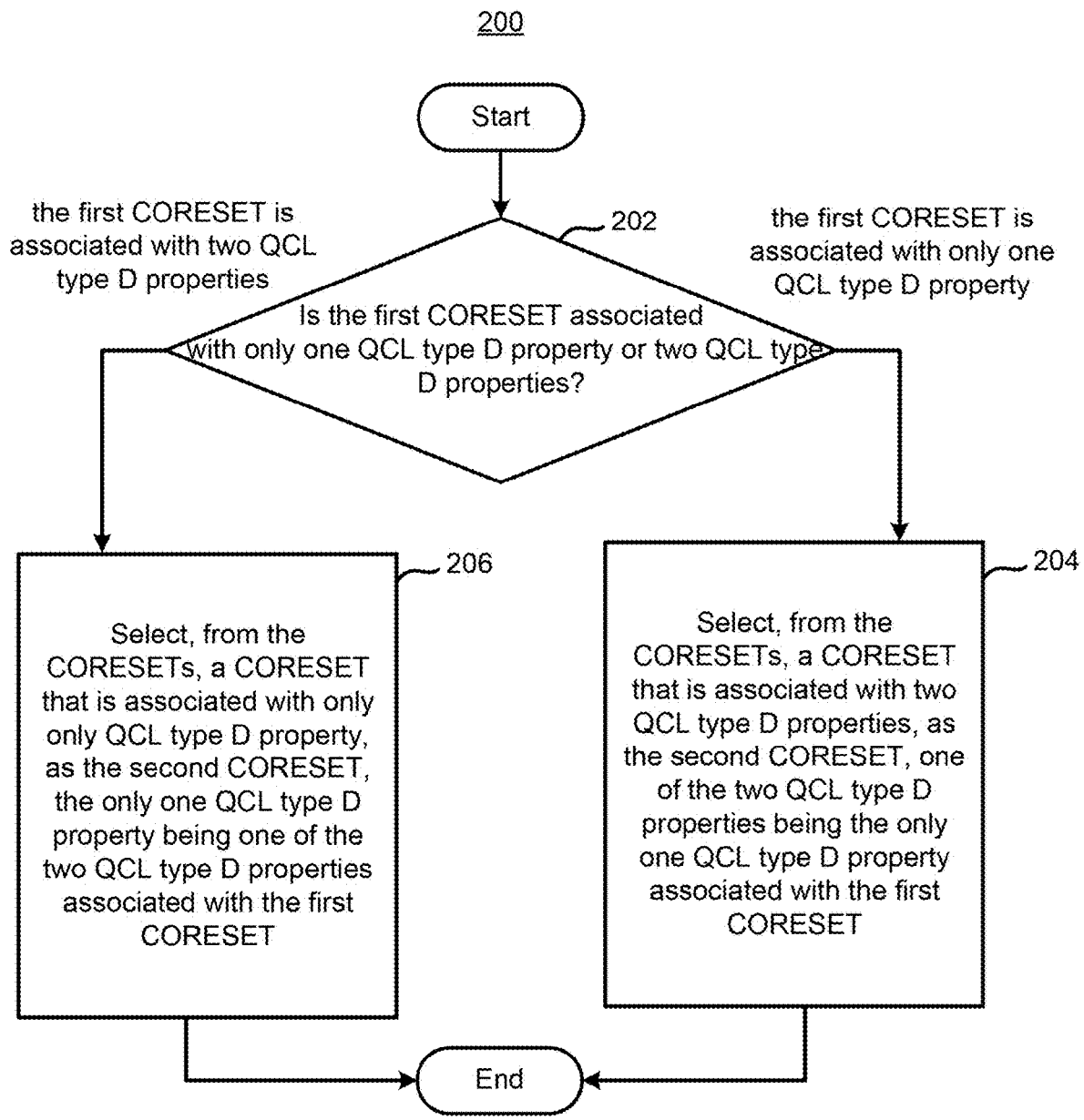
FIG. 2 is a flowchart illustrating a method/process for determining a second CORESET, according to an example implementation of the present disclosure.

FIG. 2 is a flowchart illustrating method/process 200 for determining a second CORESET, according to an example implementation of the present disclosure. Method/process 200 may correspond to the set of operations described in action 106 of FIG. 1. Although actions 202, 204, and 206 are illustrated, as separate actions, represented as independent blocks in FIG. 2, these separately illustrated actions should not be construed as to be necessarily order-dependent. The order in which the actions are performed in FIG. 2 is not intended to be construed as a limitation, and any number of the disclosed blocks may be combined in any order to implement the method, or an alternative method. Each of actions 202, 204, and 206 may be performed independent of the other actions, and may be omitted in some implementations of the present disclosure. Moreover, method/process 200 may be combined with other procedures/methods described in the present disclosure. Method/process 200 may be performed by a UE, with each action of process 200 corresponding to an operation executed by the UE.

In action 202, process 200 may start by determining whether a first CORESET (e.g., described above in action 104 of process 100) is associated with only one QCL type D property or two QCL type D properties.

In action 204, in response to determining that the first CORESET is associated with only one QCL type D property, process 200 may select, from the CORESETs (e.g., the CORESETs overlapping in the time domain and indicated in the configuration received from the BS, as described in action 102 of process 100), a CORESET that is associated with two QCL type D properties, as the second CORESET. One of two QCL type D properties is the only one QCL type D property that is associated with the first CORESET.

In action 206, in response to determining that the first CORESET is associated with two QCL type D properties, process 200 may select, from the CORESETs (e.g., the CORESETs overlapping in the time domain and indicated in the configuration from the BS, as described in action 102 of process 100), a CORESET that is associated with only one QCL type D property, as the second CORESET. The second QCL type D property associated with the second CORESET is one of the two QCL type D properties that are associated with the first CORESET.

In some implementations, one of the first CORESET and the second CORESET may be configured to be associated with two TCI states for an SFN-based PDCCH scheme, and the other one of the first CORESET and the second CORESET may be configured to be associated with a single TCI state for a TDM-based PDCCH repetition scheme. For example, when the first CORESET has only one QCL type D property (e.g., the first QCL type D property), the first CORESET may be configured for the TDM-based PDCCH repetition scheme, and the second CORESET with two QCL type D properties may be configured for the SFN-based PDCCH scheme. Conversely, when the first CORESET has two QCL type D properties, the first CORESET may be configured for the SFN-based PDCCH scheme, and the second CORESET with only one QCL type D property (e.g., the second QCL type D property) may be configured for the TDM-based PDCCH repetition scheme.

According to FIG. 1 and FIG. 2, in a scenario where the UE has initially decided to monitor CORESET #1, which is associated with only QCL type D property #1, any subsequent CORESETs that the UE may be allowed to monitor should also be associated with QCL type D property #1. This ensures that the total number of different QCL type D properties does not exceed 2. For example, if the UE selects CORESET #2 as the second CORESET to monitor, and CORESET #2 is associated with two QCL type D properties, one of the two QCL type D properties may be QCL type D property #1. In this case, CORESET #2 is associated with QCL type D property #1 and QCL type D property #2.

If the UE then selects a third CORESET to monitor, such as CORESET #3, the QCL type D properties associated with CORESET #3 may be limited to one of the following options:
(1) Only associated with QCL type D property #1,
(2) Only associated with QCL type D property #2, and
(3) Associated with both QCL type D property #1 and QCL type D property #2.

This restriction ensures that the total number of different QCL type D properties associated with the monitored CORESETs does not exceed 2. By adhering to this rule, the UE may efficiently manage its monitoring resources while maintaining compatibility with the network configuration.

In a different scenario, if the UE initially decides to monitor CORESET #1, which is associated with two QCL type D properties (e.g., QCL type D property #1 and QCL type D property #2), any subsequent CORESETs that the UE may monitor should be associated with at least one of the two QCL type D properties. This approach ensures that the total number of different QCL type D properties does not exceed 2. For example, if the UE selects CORESET #2 as the second CORESET to monitor, the one or more QCL type D properties associated with CORESET #2 may be limited to one of the following options:
(1) Only associated with QCL type D property #1,
(2) Only associated with QCL type D property #2, and
(3) Associated with both QCL type D property #1 and QCL type D property #2.

Figure 3:
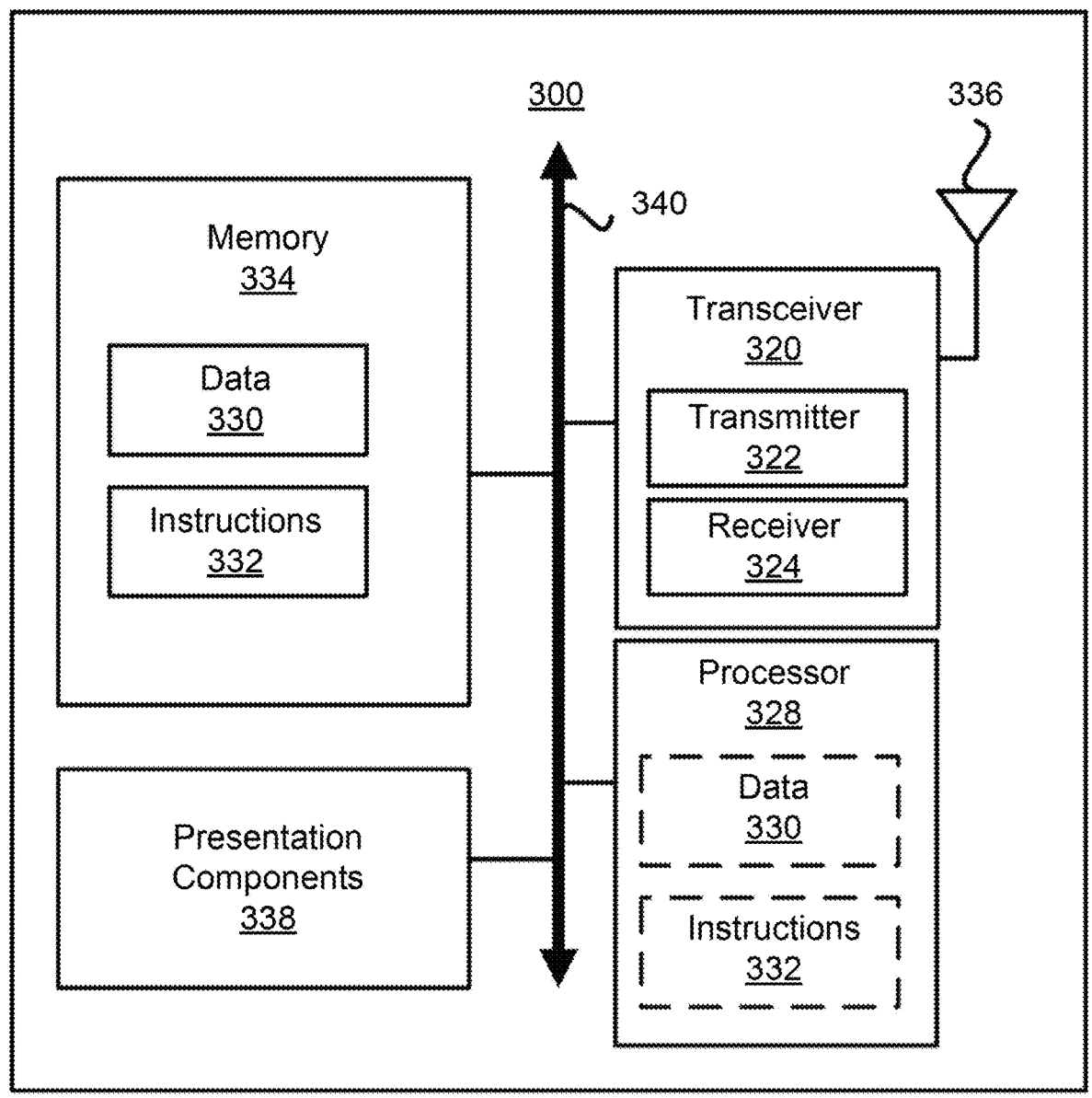
FIG. 3 is a block diagram illustrating a node for wireless communication, according to an example implementation of the present disclosure.

FIG. 3 is a block diagram illustrating node 300 for wireless communications, in accordance with various aspects of the present disclosure. As illustrated in FIG. 3, node 300 may include transceiver 320, processor 328, memory 334, one or more presentation components 338, and at least one antenna 336. Node 300 may also include a radio frequency (RF) spectrum band module, a BS communications module, a network communications module, and a system communications management module, Input/Output (I/O) ports, I/O components, and a power supply (not illustrated in FIG. 3).

Each of the components may directly or indirectly communicate with each other over one or more buses 340. Node 300 may be a UE or a BS that performs various functions disclosed with reference to FIGS. 1 through 2.

Transceiver 320 has transmitter 322 (e.g., transmitting/transmission circuitry) and receiver 324 (e.g., receiving/reception circuitry) and may be configured to transmit and/or receive time and/or frequency resource partitioning information. Transceiver 320 may be configured to transmit in different types of subframes and slots including, but not limited to, usable, non-usable, and flexibly usable subframes and slot formats. Transceiver 320 may be configured to receive data and control channels.

Node 300 may include a variety of computer-readable media. Computer-readable media may be any available media that may be accessed by node 300 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules, or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave, or other transport mechanisms and include any information delivery media.

The term "modulated data signal" may imply a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the previously listed components should also be included within the scope of computer-readable media.

Memory 334 may include computer-storage media in the form of volatile and/or non-volatile memory. Memory 334 may be removable, non-removable, or a combination thereof. Example memory may include solid-state memory, hard drives, optical-disc drives, etc. As illustrated in FIG. 3, memory 334 may store a computer-readable and/or computer-executable instructions 332 (e.g., software codes) that are configured to, when executed, cause processor 328 to perform various functions disclosed herein, for example, with reference to FIGS. 1 through 2. Alternatively, instructions 332 may not be directly executable by processor 328 but may be configured to cause node 300 (e.g., when compiled and executed) to perform various functions disclosed herein.

Processor 328 (e.g., having processing circuitry) may include an intelligent hardware device, e.g., a Central Processing Unit (CPU), a microcontroller, an ASIC, etc. Processor 328 may include memory. Processor 328 may process data 330 and instructions 332 received from memory 334, and information transmitted and received via transceiver 320, the baseband communications module, and/or the network communications module. Processor 328 may also process information to send to transceiver 320 for transmission via antenna 336 to the network communications module for transmission to a CN.

One or more presentation components 338 may present data indications to a person or another device. Examples of presentation components 338 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a User Equipment (UE) for receiving Downlink (DL) signaling from a Base Station (BS), the method comprising:
   receiving, from the BS, via a Radio Resource Control (RRC) message, a configuration of a plurality of Control Resource Sets (CORESETs) overlapping in time domain;
   selecting a first CORESET from the plurality of CORESETs based on the configuration;
   selecting a second CORESET from the plurality of CORESETs by performing a set of operations comprising:
      in response to determining that the first CORESET is associated with only one Quasi-Co-Location (QCL) type D property, selecting, from the plurality of CORESETs, a CORESET that is associated with two QCL type D properties, as the second CORESET, one of the two QCL type D properties being the only one QCL type D property associated with the first CORESET; and
      in response to determining that the first CORESET is associated with two QCL type D properties, selecting, from the plurality of CORESETs, a CORESET that is associated with only one QCL type D property as the second CORESET, the only one QCL type D property being one of the two QCL type D properties associated with the first CORESET; and
   monitoring, at least, the first CORESET and the second CORESET to receive the DL signaling from the BS.

2. The method of claim 1, wherein the first CORESET includes a lowest Common Search Space (CSS) set index and a lowest Component Carrier (CC) index among the plurality of CORESETs.

3. The method of claim 1, wherein:
   one of the first CORESET and the second CORESET is configured to be associated with two Transmission Configuration Indication (TCI) states for a Single Frequency Network (SFN)-based Physical Downlink Control Channel (PDCCH) scheme, and
   the other one of the first CORESET and the second CORESET is configured to be associated with a single TCI state for a Time Division Multiplexing (TDM)-based PDCCH repetition scheme.

4. The method of claim 1, wherein the first CORESET is configured in a first cell and the second CORESET is configured in a second cell.

5. The method of claim 4, wherein the second cell comprises a target cell for a handover procedure.

6. The method of claim 1, further comprising:
   selecting a third CORESET from the plurality of CORESETs; and
   monitoring the first CORESET, the second CORESET, and the third CORESET to receive the DL signaling from the BS.

7. The method of claim 6, wherein the third CORESET is associated with at least one QCL type D property that is the same as the QCL type D property that is associated with the first CORESET when the first CORESET is associated with only one QCL type D property.

8. A User Equipment (UE) for receiving Downlink (DL) signaling from a Base Station (BS), the UE comprising:
   at least one processor; and
   at least one non-transitory computer-readable medium coupled to the at least one processor and storing one or more computer-executable instructions that, when executed by the at least one processor, cause the UE to:
      receive, from the BS, via a Radio Resource Control (RRC) message, a configuration of a plurality of Control Resource Sets (CORESETs) overlapping in time domain;
      select a first CORESET from the plurality of CORESETs based on the configuration;
      select a second CORESET from the plurality of CORESETs by performing a set of operations comprising:
         in response to determining that the first CORESET is associated with only one Quasi-Co-Location (QCL) type D property, selecting, from the plurality of CORESETs, a CORESET that is associated with two QCL type D properties, as the second CORESET, one of the two QCL type D properties being the only one QCL type D property associated with the first CORESET; and
         in response to determining that the first CORESET is associated with two QCL type D properties, selecting, from the plurality of CORESETs, a CORESET that is associated with only one QCL type D property as the second CORESET, the only one QCL type D property being one of the two QCL type D properties associated with the first CORESET; and
      monitor, at least, the first CORESET and the second CORESET to receive the DL signaling from the BS.

9. The UE of claim 8, wherein the first CORESET includes a lowest Common Search Space (CSS) set index and a lowest Component Carrier (CC) index among the plurality of CORESETs.

10. The UE of claim 8, wherein:
    one of the first CORESET and the second CORESET is configured to be associated with two Transmission Configuration Indication (TCI) states for a Single Frequency Network (SFN)-based Physical Downlink Control Channel (PDCCH) scheme, and
    the other one of the first CORESET and the second CORESET is configured to be associated with a single TCI state for a Time Division Multiplexing (TDM)-based PDCCH repetition scheme.

11. The UE of claim 8, wherein the first CORESET is configured in a first cell and the second CORESET is configured in a second cell.

12. The UE of claim 11, wherein the second cell comprises a target cell for a handover procedure.

13. The UE of claim 8, wherein the one or more computer-executable instructions, when executed by the at least one processor, further cause the UE to:
    select a third CORESET from the plurality of CORESETs; and
    monitor the first CORESET, the second CORESET, and the third CORESET to receive the DL signaling from the BS.

14. The UE of claim 13, wherein the third CORESET is associated with at least one QCL type D property that is the same as the QCL type D property that is associated with the first CORESET when the first CORESET is associated with only one QCL type D property.

* * * * *